Jan. 6, 1953         H. M. HEYN         2,624,561
HEAT-TREATING FURNACE
Original Filed Jan. 31, 1946

Inventor
Henry M. Heyn
By Charles A. Lind
Attorney

Patented Jan. 6, 1953

2,624,561

UNITED STATES PATENT OFFICE 2,624,561

HEAT-TREATING FURNACE

Henry M. Heyn, Toledo, Ohio, assignor to Surface Combustion Corporation, Toledo, Ohio, a corporation of Ohio Continuation of application Serial No. 644,460, January 31, 1946. This application September 20, 1949, Serial No. 116,776

2 Claims. (Cl. 263—34)

This invention relates to a furnace for heat treating relatively small size articles in an atmosphere of controlled composition. Small size articles such as are ordinarily handed in bulk are well adapted for advancement in a horizontal direction along a helical passageway within a rotary tubular conveyor extending longitudinally within a heating chamber to a point where the articles must be discharged through an opening in the bottom wall of the heating chamber. It is customary to provide heat in the heating chamber by burners firing thereinto hence the atmosphere in said chamber consists of products of combustion. But there are many heat treating operations requiring the use of a specially prepared atmosphere for the articles being heated and it is the object of the present invention to provide improvements which shall make it practical to dispense with burners firing directly into said chamber to the end that an atmosphere of controlled composition may be maintained in the heating chamber.

For a consideration of what I believe to be novel and my invention, attention is directed to the following specification and the claims appended thereto.

Figure 1:
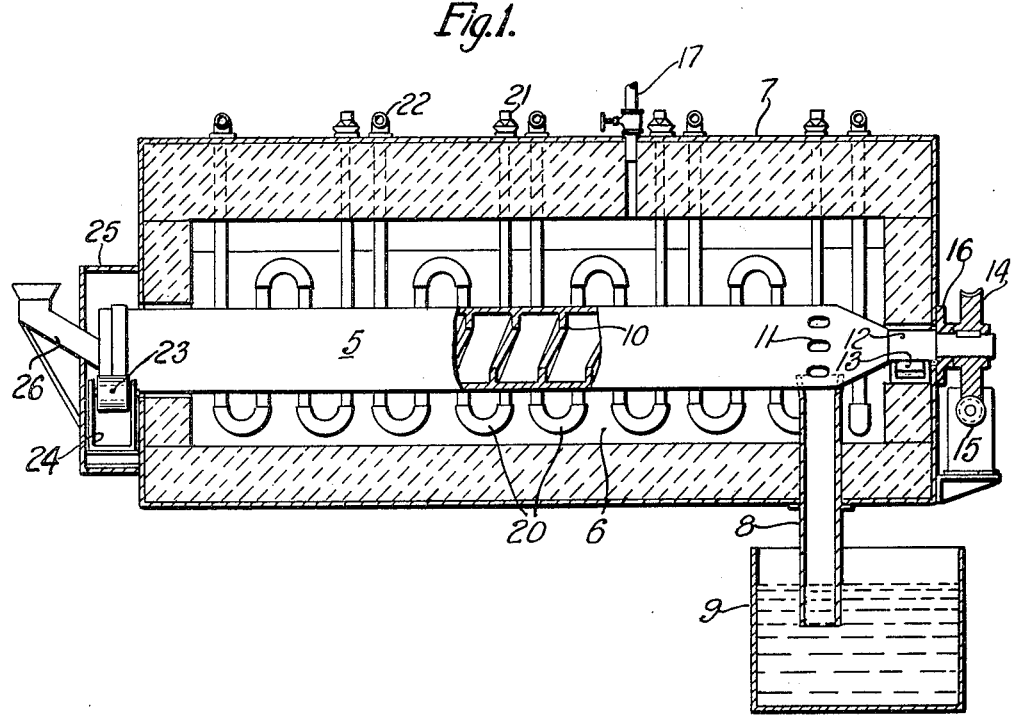
Fig. 1 is a view in vertical longitudinal section of a heat treating furnace embodying the present invention.
Figure 3:
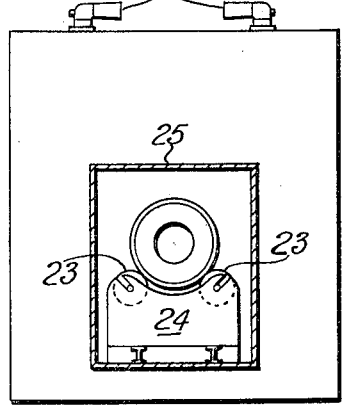
Fig. 3 is an elevation of the left-hand end of Fig. 1 with a portion broken away to show certain features.
Figure 2:
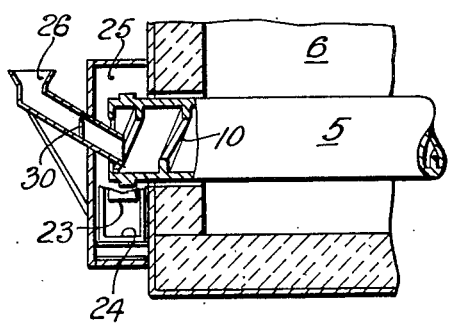
Fig. 2 is a fragmentary sectional view of the left-hand end of Fig. 1.

In the present invention the articles to be heat treated are heated while being advanced in a horizontal direction along a helical passageway within a rotary tubular conveyor 5 extending longitudinally within a heating chamber 6 defined by a refractory lining within a substantially gas tight metal casing 7. The helical passageway is formed by a helical rib 10 within the conveyor tube 5. The heated articles are discharged from the conveyor tube through a ring of holes 11 in the wall of the latter at a point above a chute 8 which extends through the bottom wall of the heating chamber and into a quench tank 9. At its discharge end, the tube 5 is supported by a stub shaft 12 which is supported on an underlying roller bearing 13 mounted in an opening in the adjacent end wall of the heating chamber 6, the exterior side of the opening being sealed substantially gas tight as by a collar 16 mounted on the stub shaft. A worm wheel 14 is keyed on the stub shaft to rotate the conveyor tube and the wheel is driven by a power driven worm 15.

The charge or article receiving end of the conveyor tube 5 extends through an opening in the front end wall of the heating chamber 6 and is supported for free axial movement due to thermal expansion on roller bearings 23 mounted on a supporting stand 24. A gas tight seal is formed about the projecting end of said tube 5 by a box-like casing 25 extending from the front end wall of the heating chamber. An article supply chute 26 extends gas tight through the end wall of the casing 25 with its discharge end within the adjacent end of the conveyor tube 5.

A gas of controlled composition is admitted to the heating chamber 6 through a supply pipe 17 whereby to maintain an atmosphere of controlled composition in the heating chamber so that the articles being heated in the conveyor tube 5 may be enveloped by said gas. The ring of holes 11 in the wall of the conveyor tube establish direct communication between the interior of said tube and the heating chamber 6 and therefore the gas supplied to said chamber is free to enter said tube.

The most likely place for air to enter the heating chamber is through the article supply chute 26 but infiltration of air at that point is reduced to a minimum by permitting gas from said chamber to bleed to the atmosphere through said chute. Excessive outflow of said gas may be prevented in any preferred way as by reducing the effective discharge area by a flap valve 30 adapted to be pushed open by the downcoming articles.

In this present invention the heating chamber 6 is heated by fuel heated radiant tubes 20 arranged within said chamber in any preferred pattern but with their inlet and outlet ends outside of said chamber, there being a burner 21 delivering to the inlet end of the tube and eductor 22 at the discharge end of the tube.

This application is a continuation of application Ser. No. 644,460 filed January 31, 1946, now abandoned.

What I claim is:

1. In a furnace for heat treating relatively small size articles in a controlled atmosphere, in combination, wall means including front and rear end walls defining a substantially gas tight heating chamber for said articles and wherein a plenum of said atmosphere can be maintained, internally heated radiant tubes in said chamber for producing heat therein, a horizontally disposed rotary tube wherein said articles are supported and advanced during heat treatment and having its discharge end within said chamber adjacent the said rear end wall of the latter, the said front end wall of said chamber having an aperture through which the charging end of said rotary tube projects out of said chamber, wall means projecting from the exterior side of said front end wall to define about the projecting end of said rotary tube a housing which is in communication with said chamber through said aperture so that gas in said chamber is free to enter said housing, means for conducting said articles to the charge end of said rotary tube comprising a tubular member wherethrough said articles may be moved, said tubular member extending into said housing with its discharge end in sufficiently close proximity to the charge end of said rotary tube for the articles to be received by the latter, and said tubular member constituting a passage through which a stream of gas in said housing may pass to the outside atmosphere.

2. In a furnace according to claim 1, in combination, a tubular discharge chute extending from said chamber with its receiving end disposed next under the discharge end of said rotary tube to receive articles therefrom and its discharge end extending through said wall means, said discharge end of the discharge tube being adapted to be submerged in a liquid cooling medium whereby flow of gas therefrom is prevented, and means for delivering gas to said chamber whereby to supply atmosphere thereto for flow through said rotary tube and said tubular member.

HENRY M. HEYN.

REFERENCES CITED

The following references are of record in the file of this patent:

UNITED STATES PATENTS

| Number | Name | Date |
|---|---|---|
| 1,256,703 | Landers | Feb. 19, 1918 |
| 1,656,924 | Smith | Jan. 24, 1928 |
| 2,041,312 | Winder et al. | May 19, 1936 |
| 2,207,987 | Kent et al. | Jan. 16, 1946 |
| 2,443,620 | Hubbard | June 22, 1948 |

FOREIGN PATENTS

| Number | Country | Date |
|---|---|---|
| 505,901 | Germany | Aug. 27, 1930 |